United States Patent Office 3,639,386
Patented Feb. 1, 1972

3,639,386
MONO AZO PARAZOLONE DYES HAVING THIOSULFATE GROUP
Hubbard Taylor Busby, Jr., Charlotte, N.C., assignor to Martin Marietta Corporation, New York, N.Y.
No Drawing. Filed Nov. 28, 1969, Ser. No. 880,927
Int. Cl. C09b 29/38; D06p 1/02
U.S. Cl. 260—163          8 Claims

ABSTRACT OF THE DISCLOSURE

Water-soluble azo dyes of formula

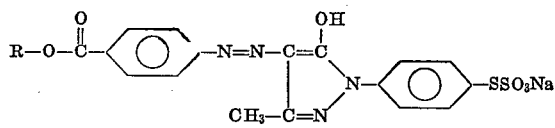

are prepared by coupling equimolar amounts of

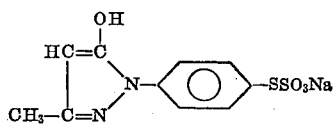

and a diazotized aminobenzoate of the formula

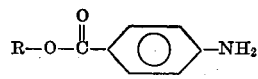

wherein R is methyl, ethyl, n-propyl, isopropyl, isobutyl, n-butyl or β-chloroethyl. Bright golden yellow dyeings result on cotton textiles when aqueous compositions of the dyes are applied thereto and subsequently fixed with the aid of $Na_2S_4$.

---

The present invention relates to water-soluble azo dyes having a thiosulfate group, and to the method for making same.

The dyes of the present invention are particularly characterized in having the general formula

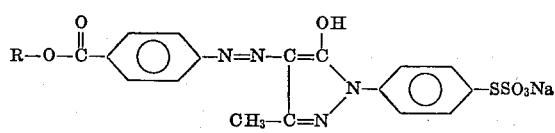

wherein R is methyl, ethyl, n-propyl, isopropyl, isobutyl, n-butyl or β-chloroethyl.

The method of the present invention is particularly characterized as follows. In the method for making an azo dye by coupling equimolar amounts of a diazotized amine and the coupling component of the formula

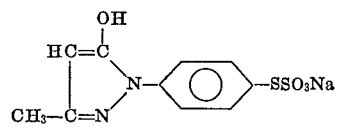

the improvement characterized in that the diazotized amine is a diazotized aminobenzoate of the formula

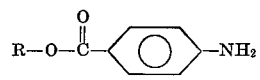

and that the resulting azo dye has the formula

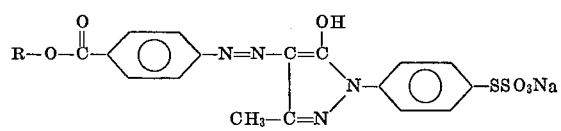

wherein R is methyl, ethyl, n-propyl, isopropyl, isobutyl, n-butyl or β-chloroethyl.

The dyes of the present invention are particularly useful for dyeing cotton textile fibers to bright golden yellow shades by the dyeing method described in U.S. Pat. No. 3,419,343, namely by padding an aqueous composition of the dye onto cotton fabric, squeezing the fabric, drying the fabric, padding the fabric through an aqueous solution of $Na_2S_4$ and NaCl, squeezing the fabric, passing the fabric through air for about 30 seconds, washing and drying the fabric.

Cotton dyeings so prepared have excellent light fastness, for example as much as 40 hours light fastness in the carbon arc light fastness tester when dyed as heavy shades, depending on the particular dye selected. Some additional advantages of the dyes of the present invention and dyeings made therefrom follow. The dyeings are fast to ozone, have very good wash fastness to the No. 3 AATCC wash test, light fastness is slightly improved by resination with melamine type resin, and there is improved wash fastness and no shade change when the dyeings are subject to permanent press resin finishing in known manner (U.S. Pat. No. 2,974,432) using dimethylol dihydroxy ethylene urea resin. Moreover, the dyes of the present invention have excellent tolerance to salt at the salt concentrations customarily used in dyeing, and are easily soluble in water without the aid of alkali.

It is particularly surprising and unexpected that the dyes of the present invention have excellent light fastness together with other desirable properties, for the following reasons. Most azo dyes having thiosulfate groups have moderate or less than desirable light fastness, and one of the important research problem areas in this art is centered on attempts to develop such dyes having excellent light fastness together with other acceptable properties. Moreover, I have found that the dye resulting from coupling equimolar amounts diazotized isoamyl-4-aminobenzoate and

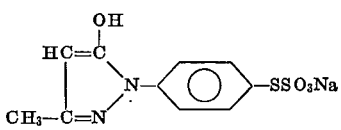

has poor light fastness when applied at a heavy shade to cotton fabric by the dyeing method described herein, breaking after only 10 hours in the carbon arc light fastness tester.

The following is a more detailed description of the present invention.

The dyes of the present invention are prepared by coupling equimolar amounts of an aminobenzoate of the formula

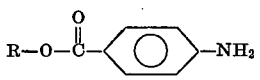

and a coupling component of the formula

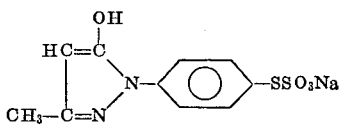

wherein R is methyl, ethyl, n-propyl, isopropyl, n-butyl, isobutyl or β-chloroethyl. The coupling may be conducted under acid, alkaline or neutral conditions, but is preferably conducted under slightly alkaline conditions with $NaHCO_3$ buffer. If conducted under acid conditions, the dye is finished off on the alkaline side with sodium containing base, such as aqueous $Na_2CO_3$.

Examples of aminobenzoates of the formula

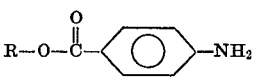

wherein R is as above defined, suitable for use in the present invention are methyl-4-aminobenzoate, ethyl-4-aminobenzoate, n-propyl-4-aminobenzoate, isopropyl-4-aminobenzoate, isobutyl-4-aminobenzoate, n-butyl-4-aminobenzoate, and β-chloroethyl-4-aminobenzoate.

Aminobenzoates of the formula

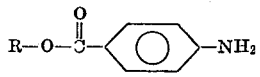

wherein R is as above defined, may be prepared as follows. Heat for six hours 0.1 G.M.W. p-nitrobenzoylchloride and 0.1 G.M.W. of an alcohol of the formula R—OH, wherein R is as above defined, slurry the resulting solid with 300 mls. 1 N aqueous $Na_2CO_3$ for 45 minutes, recover the solids by filtration, wash the solids with water until the run-off is neutral, and dry the resulting nitroester of the formula

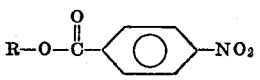

wherein R is as above defined, at 60° C. Reduce the nitro group of the nitroester to an amine group by mixing 300 mls. $H_2O$, 3 ml. concentrated HCl and 0.3 G.M.W. iron powder in a vessel, heating to reflux, gradually adding 0.1 G.M.W. of the above nitroester during 30 minutes while holding at reflux, refluxing 8 hours, adding $Na_2CO_3$ until pH 8 is obtained, filtering while hot on a pre-heated Buchner funnel, and saving the resulting filter cake "A" and filtrate "B." Recover one portion of the aminobenzoate from the filter cake "A" by extracting the aminobenzoate with acetone and evaporating the acetone. Recover the other portion of the aminobenzoate from filtrate "B" by cooling it to 5° C., filtering, and recovering the aminobenzoate in solid form.

It will be understood that R is the same in the alcohol R—OH selected, the nitroester prepared therefrom, the aminobenzoate prepared from the nitroester, and in the dye prepared from the diazotized aminobenzoate.

The following are illustrative examples in which all parts are by weight unless otherwise specified.

EXAMPLE 1

The dyestuff of the formula

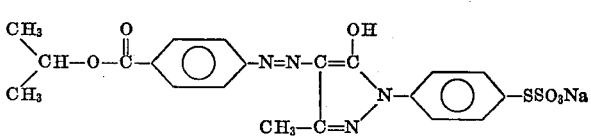

may be prepared as follows.

1 G.M.W. of isopropyl-4-aminobenzoate is diazotized by adding it to 1.5 liters water at room temperature, adding thereto 250 gms. 36% aqueous HCl, stirring 1 hour at room temperature, cooling to 5° C., and adding dropwise 250 ml. 4 N $NaNO_2$ while maintaining 0°–5° C. Stir 1 hour at 0°–5° C. and destroy any excess nitrous acid by adding sulfamic acid. Maintain the resulting diazo solution at 0°–5° C.

1 G.M.W. of

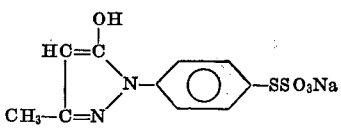

(Example 27 U.S. Pat. No. 3,346,550) is added to 1.5 liters $H_2O$ at room temperature, 125 gms. $Na_2CO_3$ are added, the composition is clarified by pouring it through ground charcoal, 350 gms. $NaHCO_3$ are added, and the composition is cooled to 5° C. The above diazo solution is added dropwise with stirring, while maintaining 0°–5° C. Stir 12–15 hours at 0°–5° C. to insure completion of the coupling reaction. The yellow dyestuff is recovered by adding 500 gms. NaCl, stirring, collecting the resulting solids by filtration, and drying at 40° C.

The dye of Example 1 may be dyed to a heavy shade as follows. Onto mercerized cotton fabric weighing 4 oz./sq. yd. is padded a dye composition consisting of 25 gms. of the dye produced by Example 1 above and 10 gms. $Na_2CO_3$ per liter of water at 160° F. The fabric is squeezed to 60% wet pick-up based on fabric weight; dried; padded through an aqueous solution consisting of 6.05 gms. $Na_2S_4$ and 200 gms. NaCl per liter of water at room temperature; squeezed with nip rollers; passed through air 30 seconds; rinsed with water by passing through 3 wash boxes equipped with exit nip rollers; scoured by passing through two wash boxes equipped with exit nip rollers and containing an aqueous solution of neutral detergent at 180° F.; rinsed with water and dried.

The resulting dyeing is bright golden yellow; it has excellent light fastness (no break in carbon arc light fastness tester after 40 hours), excellent ozone fastness, very good wash fastness to No. 3 AATCC wash fastness test, excellent dry crocking and very good wet crocking properties. One portion of the dyeing was resinated with melamine type resin, and light fastness of the dye in the resinated fabric was slightly improved. Another portion of the dyeing was subjected to permanent press resin finishing using dimethylol dihydroxy ethylene urea resin, and there was no shade change and wash fastness of the dye in the permanent press fabric was improved.

EXAMPLES 2–7

In the examples given in the following table, the dye synthesis procedure is the same as that given in Example 1 above, except that the aminobenzoate shown in the second column is substituted for the isopropyl-4-aminobenzoate used in Example 1, to produce the azo dyestuff shown in the third column. Heavy shades dyeings made on cotton fabric from the dyes of the following examples by the above described dyeing method are all bright golden yellow, and have the light fastness indicated in the fourth column when tested on the carbon arc light fastness tester.

2. The azo dye of the formula

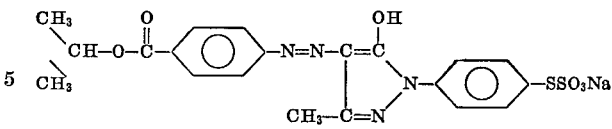

3. The azo dye of the formula

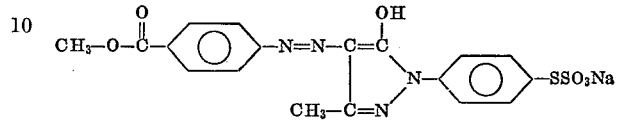

| Ex. No. | Aminobenzoate | Azo dye | Light fastness |
|---|---|---|---|
| 2 | Methyl-4-aminobenzoate | 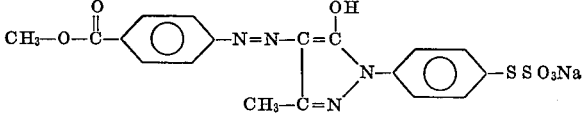 | Slight break at 40 hours. |
| 3 | Ethyl-4-aminobenzoate | 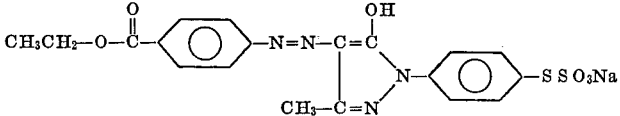 | Break at 40 hours. |
| 4 | n-Propyl-4-aminobenzoate | 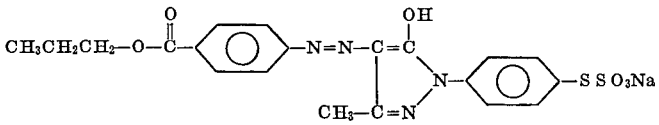 | Do. |
| 5 | Isobutyl-4-aminobenzoate | 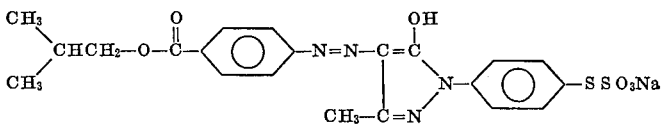 | Slight break at 40 hours. |
| 6 | n-Butyl-4-aminobenzoate | 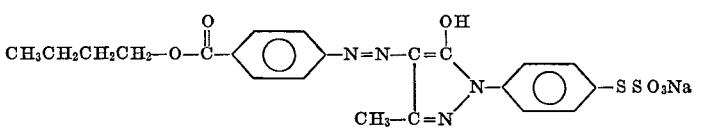 | Slight break after 25 hours. |
| 7 | β-Chloroethyl-4-aminobenzoate | 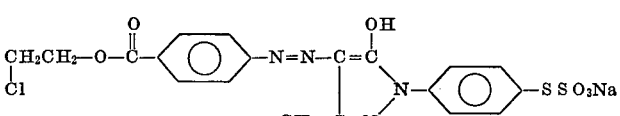 | Do. |

What is claimed is:

1. An azo dye of the formula

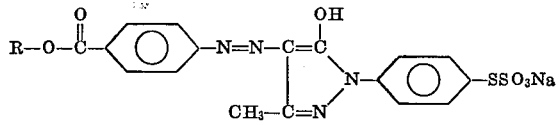

wherein R is methyl, ethyl, n-propyl, isopropyl, isobutyl, n-butyl, or β-chloroethyl.

4. The azo dye of the formula

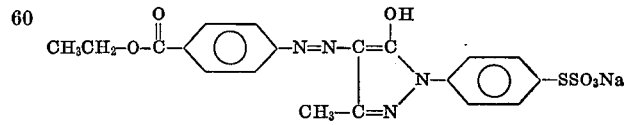

5. The azo dye of the formula

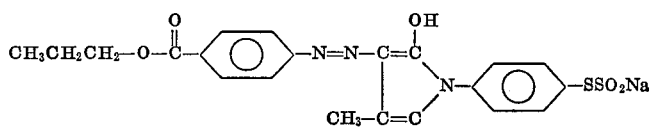

6. The azo dye of the formula
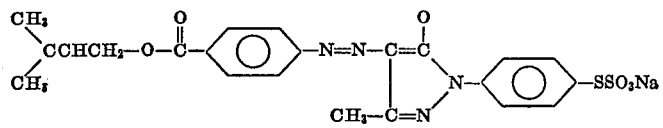
7. The azo dye of the formula
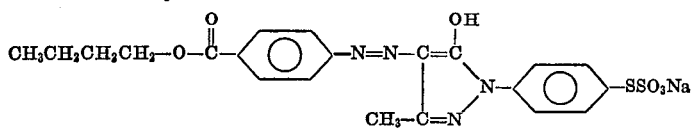
8. The azo dye of the formula
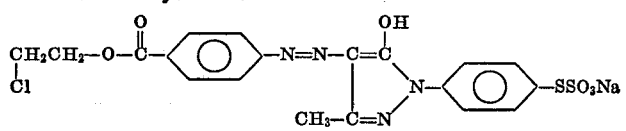
References Cited
UNITED STATES PATENTS
3,346,550  10/1967  Geselbracht _____ 260—163
CHARLES B. PARKER, Primary Examiner
D. M. PAPUGA, Assistant Examiner
U.S. Cl. X.R.
8—542